J. J. Emery.
Surge-Reliever.

No. 3,838. Reissued Feb. 15. 1870.

John J. Emery
by his attorney.
R. H. Eddy

S. N. Pepin
J. R. Snow

United States Patent Office.

JOHN J. EMERY, OF OWL'S HEAD, MAINE, FOR HIMSELF AND E. R. CHENEY, OF BOSTON, MASSACHUSETTS, ASSIGNEE OF JOHN J. EMERY.

*Letters Patent No.* 94,950, *dated September* 21, 1869; *reissue No.* 3,838, *dated February* 15, 1870.

IMPROVEMENT IN SURGE-RELIEVERS.

The Schedule referred to in these Letters Patent and making part of the same

*To all whom it may concern:*

Be it known that JOHN J. EMERY, of Owl's Head, in the county of Knox, and State of Maine, did invent a new and useful Device, which serves the purpose of a Chain-Stopper and Surge-Reliever for Cables of Vessels; and we do hereby declare the same to be fully described in the following specification, and represented in the accompanying drawings, in which—

Corresponding letters denote corresponding parts in both figures.

It is well known that chain-cables, if by any means released from the shaft or drum around which they pass, are apt to be drawn out rapidly by the anchor, or that portion of the cable which is already overboard, and that thus the whole or an unnecessary portion thereof is carried out before its motion can be stopped, and also that it is very liable to be broken by a sudden draught, or what is termed a "dead strain" of a vessel, brought upon it while the vessel may be at anchor and moved by the surf or waves.

The purpose of this invention is to provide a means for stopping the cable at any desired point while being paid out, or while going out upon a "run;" and also to ease the strain upon such cable when the vessel is at anchor, so as to prevent its breakage; and to this end It consists of a stopper having an elastic support to be so arranged as to be able to grapple the cable between the point where it is attached to the shaft or drum of the capstan or windlass, and the point where it is joined to the anchor, and thus serve as a stopper to such cable, when it is passing from the drum or shaft around which it passes; and also as a means of relieving the sudden strain upon the cable when the vessel is riding at anchor, as will be more fully explained hereinafter.

Figure 1:
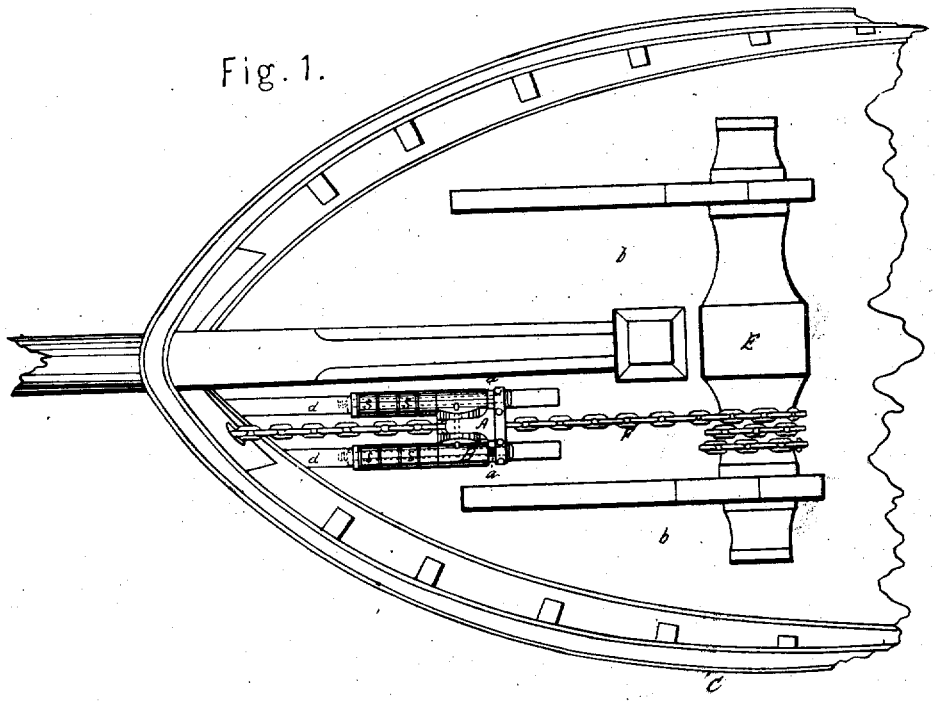
Figure 1 is a plan or top view showing the springs, the rods upon which they are placed, and the bridge B.
Figure 2:
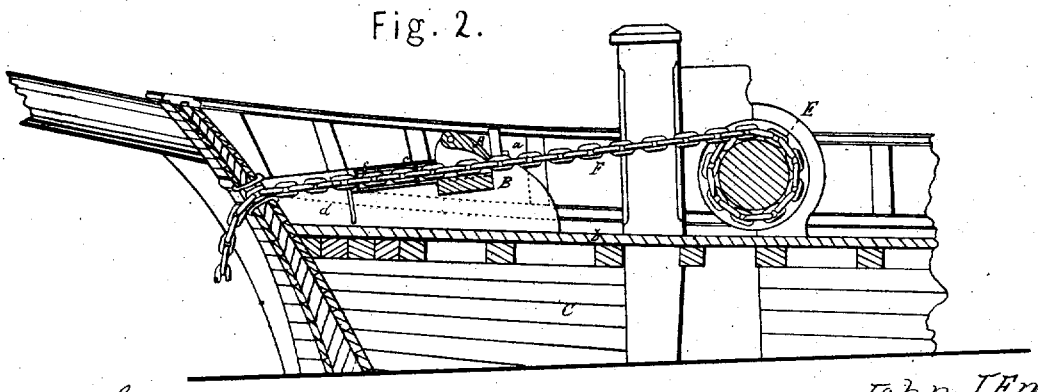
Figure 2 is a longitudinal section of it as applied to the cable.

A, in the drawings, refers to a stop-pawl, which is pivoted to the chain-bridge B, as shown in fig. 2, so that when in the position shown in said figure, it will come in contact with the links of the chain, and thus stop it at any desired point, the elasticity of the springs preventing the breakage of the device or of the cable.

B refers to a chain bridge, which is to be of metal or other suitable material, and of a form such as is shown in the drawings, or of an equivalent form, it being so constructed as to slide upon the bars or rods *a a*, and abut against a spring or springs.

As the stop-pawl A is pivoted to this bridge it follows that any strain put upon it is sustained by the spring or springs, and thus the shock upon the cable is relieved, whether it be caused by checking the movements of the chain in its passage from the shaft or drum, or by the motion of the vessel while at anchor.

*b* refers to the deck of a vessel, C, to which the abutments *d d* are secured in such a manner that the springs bear against them, and are thus prevented from moving out of place.

The springs marked S S are cylindrical in form, and are placed upon rods *a a*, which rods pass through the bridge B, and serve as a guide therefor, or as ways to move upon.

It is apparent that the form of the springs used may be varied, and that a single spring or a series of springs may be used.

The position which it is most desirable to have this device occupy is shown in the drawings, but it is apparent that its location may be varied.

We are aware that devices termed "surge-relievers" have heretofore been used which were in part composed of springs, so arranged as to cause them to be elastic, and that such devices have been applied to the cables of vessels for the purpose of relieving the strain upon such cables when the vessel is riding at anchor. But this invention differs from all such devices in that it serves the last-named purpose, and also the further purpose of a chain-stopper, so that the outward movement of the chain or cable may at any time be checked or stopped by simply lowering the stop-pawl into the position shown in fig. 2 of the drawings.

Being aware of the existence of the devices above referred to, and designated as surge-relievers, and also of the fact that chain-stoppers are in common use, we desire it to be understood that we make no claim to them separately; but having thus fully described the invention of the said JOHN J. EMERY,

What we claim, and desire to secure by Letters Patent, is—

A chain-stopper or holder, arranged to clutch the cable in combination with an elastic bearing therefor, so that the same device shall perform the double function of a chain-stopper or holder and surge-reliever, substantially as set forth.

In testimony whereof, we have signed our names to this specification before two subscribing witnesses.

J. J. EMERY.
E. R. CHENEY.

Witnesses:
GEO. THORNDIKE,
RODNEY AREY,
J. D. SPAULDING,
D. N. B. COFFIN, Jr.